Patented Oct. 2, 1945

2,385,789

UNITED STATES PATENT OFFICE 2,385,789

NORENDOMETHYLENE HEXAHYDROFLUORENYL ALCOHOL

Herman A. Bruson, Philadelphia, Pa., assignor to The Resinous Products & Chemical Company, Philadelphia, Pa., a corporation of Delaware No Drawing. Application January 6, 1944, Serial No. 517,204

2 Claims. (Cl. 260—618)

This invention relates to a new secondary alcohol, norendomethylene hexahydrofluorenyl alcohol, and to a method for its preparation.

It was found by Alder and Rickert (Ber. 71, 386) that indene and cyclopentadiene yield an adduct, 1,4-endomethylene tetrahydrofluorene, when heated together in a sealed tube. This hydrocarbon is a colorless oil boiling at 135–136° C. at 11 mm. pressure.

It is now found that this hydrocarbon yields a secondary alcohol by reacting it with water in the presence of sulfuric acid. In the preferred procedure, 1,4-endomethylene tetrahydrofluorene is reacted with a dilute sulfuric acid containing 20% to 75% of water at a temperature between about 65° C. and 130° C. The amount of water required is at least equivalent to the 1,4-endomethylene tetrahydrofluorene, and the sulfuric acid is desirably used in a molar ratio, although more or less sulfuric acid may be used since it acts primarily as a catalyst.

The mixture of hydrocarbon, acid, and water is stirred and heated. The resulting product is separated, desirably with the aid of an organic solvent immiscible with water, and suitably purified, as by distillation. If more concentrated sulfuric acid is used than in the preferred procedure, it is advantageous to cool the reaction mixture and subsequently to dilute and usually heat with water to decompose the sulfonated products first formed and thereby to yield the desired alcohol.

During the reactions involved, there occurs both a hydration and a rearrangement. These reactions yield the alcohol of this invention. The reaction may be represented as follows:

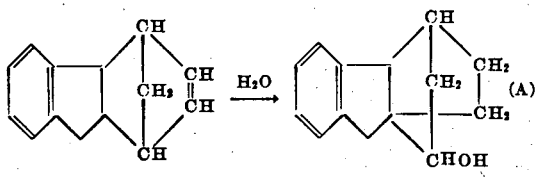

or

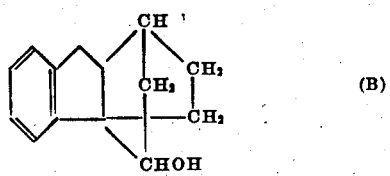

The alcohol obtained may be represented by Formula A or B, the only difference between them being the relative position of the hydroxyl group to the methylene group of the five-membered ring.

At the same time, there is formed some of the ether of the above alcohol.

The secondary alcohol formed is of value in the preparation of plasticizers, insecticides, drugs, and surface-active agents. It may be oxidized to the corresponding ketone, also a new compound, or esterified with a carboxylic acid to yield new esters useful in the plastics industry. It may be dehydrated to form a hydrocarbon isomeric with the parent hydrocarbon, from which the corresponding saturated hydrocarbon may be derived. The alcohol may be hydrogenated in the benzene cycle to yield another new alcohol.

The invention is illustrated by the following example:

A mixture of 75 grams of 1,4-endomethylene tetrahydrofluorene and 100 grams of aqueous 40% sulfuric acid is rapidly stirred and boiled under reflux at 120–125° C. for about four and one-half hours. The mixture is cooled and the dark, viscous oil separated, taken up in benzene, and the benzene solution washed thoroughly with water and dilute sodium hydroxide solution. The benzene is then distilled off and the residual oil distilled in vacuo.

The product distills over at 165–175° C./5 mm. as a viscous, pale yellow oil which rapidly crystallizes. After recrystallization from nitromethane, the pure alcohol forms colorless crystals melting at 107–108° C.

A small amount of higher-boiling material is also obtained which is the ether of the above alcohol.

The time, temperature, and concentration relationships of the above example may be considerably varied, still with favorable yields of the desired alcohol.

The 1,4-endomethylene tetrahydrofluorene may be prepared as indicated above. Applicant has found, however, that it may be more readily prepared by boiling under reflux a mixture of indene and dicyclopentadiene with or without a polymerization inhibitor. The indene is preferably used in the ratio of two mols of indene to one mol of dicyclopentadiene. This method requires only atmospheric pressure. In two to eight hours, 1,4-endomethylene tetrahydrofluorene is obtained in excellent yield and purity.

I claim:

1. A method for preparing norendomethylene hexahydrofluorenyl alcohol which comprises reacting aqueous sulfuric acid of 25% to 80% sulfuric acid content at 65° C. to 130° C. with 1,4-endomethylene tetrahydrofluorene.

2. As a new compound, norendomethylene hexahydrofluorenyl alcohol, a secondary alcohol which, when pure, consists of colorless crystals melting at 107–108° C.

HERMAN A. BRUSON.